(12) United States Patent
Simionescu et al.

(10) Patent No.: US 10,282,301 B2
(45) Date of Patent: May 7, 2019

(54) METHOD AND SYSTEM FOR HARDWARE ACCELERATED READ-AHEAD CACHING

(71) Applicant: Avago Technologies International Sales Pte. Limited, Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 23 days.

(21) Appl. No.: 15/599,201

(22) Filed: May 18, 2017

(65) Prior Publication Data

US 2018/0336138 A1  Nov. 22, 2018

(51) Int. Cl.
| | |
|---|---|
| *G06F 12/0868* | (2016.01) |
| *G06F 13/28* | (2006.01) |
| *G06F 3/06* | (2006.01) |
| *G06F 12/0862* | (2016.01) |

(52) U.S. Cl.
CPC ........ *G06F 12/0868* (2013.01); *G06F 3/0617* (2013.01); *G06F 3/0656* (2013.01); *G06F 3/0689* (2013.01); *G06F 12/0862* (2013.01); *G06F 13/28* (2013.01); *G06F 2212/1044* (2013.01); *G06F 2212/21* (2013.01); *G06F 2212/283* (2013.01); *G06F 2212/602* (2013.01); *G06F 2212/70* (2013.01)

(58) Field of Classification Search
CPC .................................................. G06F 12/0862
See application file for complete search history.

(56) References Cited

U.S. PATENT DOCUMENTS

| | | | |
|---|---|---|---|
| 5,619,723 | A | 4/1997 | Jones et al. |
| 7,155,569 | B2 | 12/2006 | Johnson et al. |
| 8,495,301 | B1 | 7/2013 | Alexander et al. |
| 9,552,297 | B2 | 1/2017 | Traut et al. |
| 2017/0242794 | A1* | 8/2017 | Simionescu .......... G06F 12/122 |

* cited by examiner

*Primary Examiner* — Gary W. Cygiel
(74) *Attorney, Agent, or Firm* — Sheridan Ross P.C.

(57) ABSTRACT

A system and method for efficient cache buffering are provided. The disclosed method determining that a read-ahead operation is to be performed in response to receiving a host Input/Output (I/O) command. In response to determining that the read-ahead operation is to be performed, allocating a new Local Message Identifier (LMID) for the read-ahead operation. The method further includes sending a buffer allocation request to a buffer manager module, the buffer allocation request containing parameters associated with the read-ahead operation and then causing the buffer manager module to allocate at least one Internal Scatter Gather List (ISGL) and Buffer Section Identifier (BSID) in accordance with the parameters contained in the buffer allocation request. The method further includes enabling the cache manager module to perform a hash search using a row or strip number and identification information available in the new LMID.

20 Claims, 12 Drawing Sheets

| Function | Opcode = ReadAhead | Host Tag Or Parent LMID |
|---|---|---|
| Msg Flags | MSI Index | Next LMID |
| LD Number | VF_ID | Counter |
| MPI Flags | SGL Skip Count/Offset | Span | RowMod |
| Strip/Row Number ||||
| Reserved | Arm | Offset In Arm | Strip/Row Number |
| NumBlocks To Read Ahead | Lead ISGL ID Or RSGL ID ||
| Control Flags | Data HSGL Or RSGL ID ||
| Primary Reference Tag ||||
| Primary App. Tag Mask | Primary App. Tag ||
| Full Hit Bitmap ||||
| Extension Flags | Extension ID ||
| Buffers Descriptor ||||

*Fig. 6*

METHOD AND SYSTEM FOR HARDWARE ACCELERATED READ-AHEAD CACHING

FIELD OF THE DISCLOSURE

The present disclosure is generally directed toward computer memory.

BACKGROUND

In a hardware-assisted caching solution, there is a need to have a read-ahead capability in the hardware to reduce the dependency across hardware and firmware to synchronize cache data structures. With solutions implementing read cache and write cache, adequate balance needs to be maintained to ensure that either of them is not filling the cache memory resulting in the other experiencing reduced cache memory access.

BRIEF DESCRIPTION OF THE DRAWINGS

The present disclosure is described in conjunction with the appended figures, which are not necessarily drawn to scale:

FIG. 6 is a block diagram depicting details of a fourth data structure used in accordance with at least some embodiments of the present disclosure;

DETAILED DESCRIPTION

Figure 1:
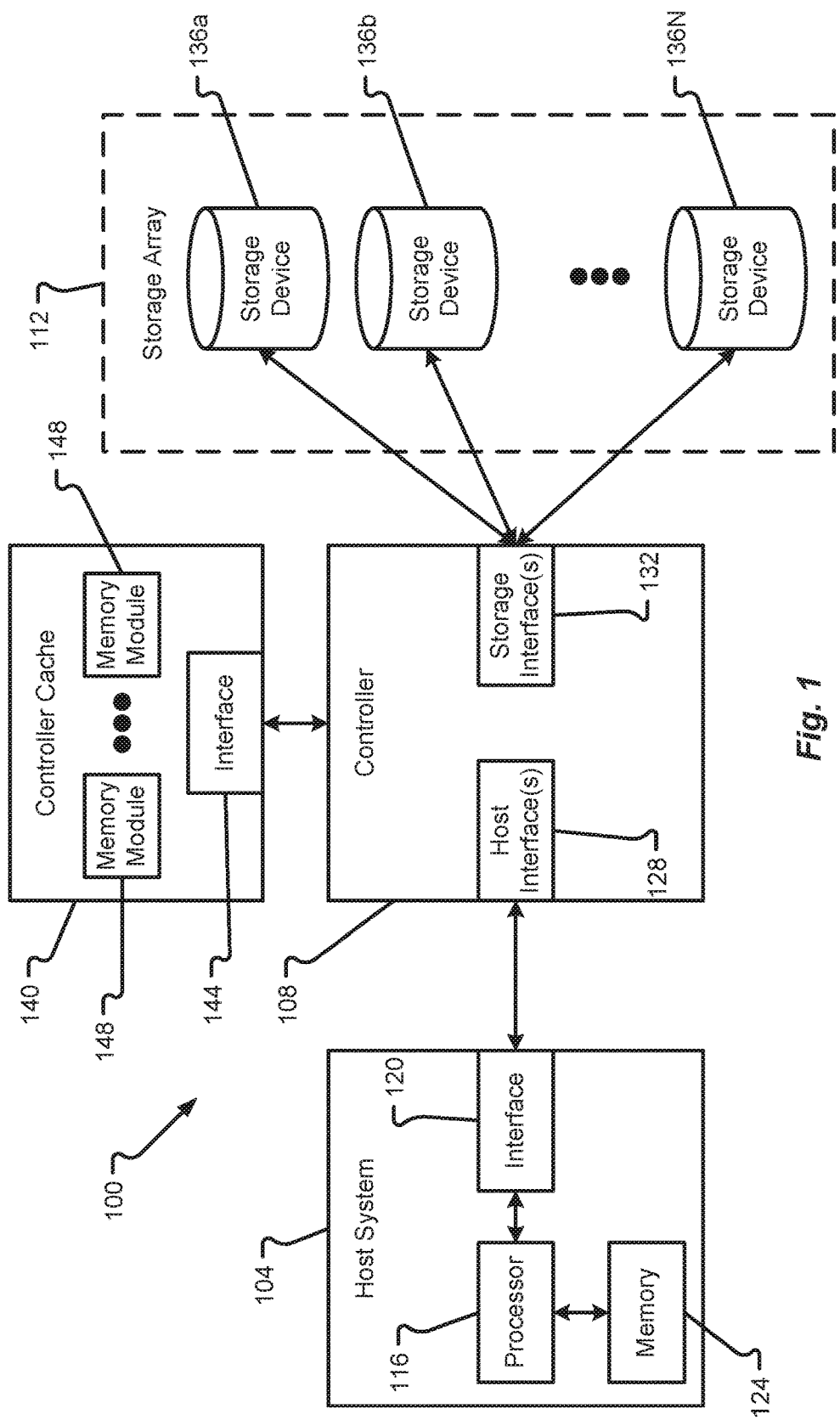
FIG. 1 is a block diagram depicting a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, a read-ahead command should be processed concurrently along with a read command or a write command without compromising the data integrity with the need for acquiring region locks. There is also a need to identify read buffers as distinct from a dirty buffer to maintain balance between a read cache and a write cache in the system. There is also a need for firmware to control a read cache by triggering flush and/or discard the read cache whenever a read cache memory becomes exhausted or the read cache becomes stale.

In general, reading data from drives when it is present in cache memory is unnecessary and hence should be avoided. The processing of flush commands and read-ahead commands should also be synchronized to avoid data inconsistencies.

It is with respect to the above-noted shortcomings that embodiments of the present disclosure were contemplated. In particular, embodiments of the present disclosure present a method for an efficient read-ahead process to give better read performance for sequential workloads. Having the read-ahead capability available in hardware reduces the dependency across hardware and firmware to synchronize cache data structures.

According to some aspects of the present disclosure, a read-ahead command can be processed concurrently along with a read command or a write command without compromising the data integrity with the need for acquiring region locks. Furthermore, a row/strip which contains a read (ahead) cache is distinguished as a read cache so that the cache management module can take intelligent decisions like delaying the flush for rows or strips that contains the read cache.

Embodiments of the present disclosure also propose a method to identify read buffers as distinct from dirty buffers to maintain a balance between the read cache and the write cache in the system. In some embodiments, a dedicated read-ahead list is also maintained to store all read cache segments.

The proposed solution provides flexibility to firmware to control the read cache by triggering flush and/or discard the read cache whenever the read cache exhausts or the read cache data becomes stale.

Another aspect of the present disclosure is to provide a method that avoids reading data from a drive when that data is otherwise available in cache memory.

In some embodiments, the present disclosure presents an advanced write buffering process that utilizes various functional blocks of a controller to enable hardware acceleration. The processes described herein are designed such that various different functional blocks can be accelerated by different hardware threads. In some embodiments, each of the functional blocks may work in its own local memory loading the global memory whenever there is a need and storing back to the global memory when the functional block is done with the usage/update.

Although embodiments of the present disclosure will be described in connection with managing a RAID architecture (e.g., a RAID-5 or RAID-6 type of architecture), it should be appreciated that embodiments of the present disclosure are not so limited. In particular, any controller that finds benefits associated with supporting variable stripe sizes can implement some or all of the functions and features described herein.

With reference to FIGS. 1-11B, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

With reference now to FIG. 1, additional details of a computing system 100 capable of implementing hashing methods and various cache lookup techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further segment the data into bits, bytes, or blocks for storage across multiple storage devices 136a-N. One or more of the storage devices 136a-N may also be used to store error correction or parity information.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 (also referred to as cache memory) or a smaller number of cache memory modules 148. The memory modules 148 may correspond to flash memory, RAM, DRAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
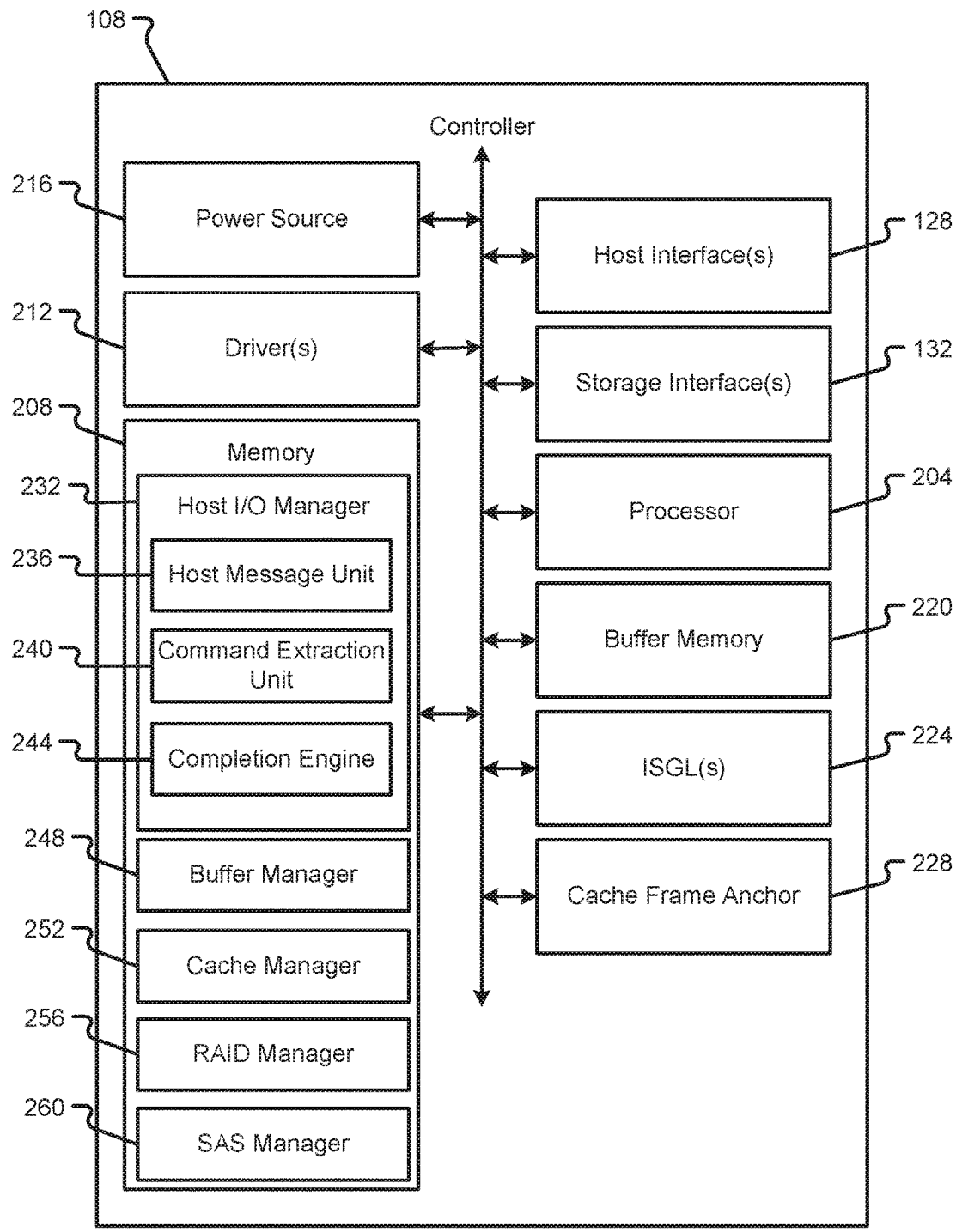
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more Internal Scatter Gather Lists (ISGLs) 224, and a cache frame anchor 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an NPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands or read-ahead commands. The cache manager 252 may also enable the processor 204 to communicate with the controller cache 140 and leverage the memory modules 148 of the controller cache 140. The cache manager 252 may also manage the creation and lifecycle of cache frame anchors 228 and/or ISGLs 224. As an example, as caching functions are executed, one or more cache frame anchors 228 may be created or utilized to facilitate the caching function. As used herein, an ISGL may represent the snapshot of data at a given point in time it is used. In some embodiments, the ISGL is capable of encapsulating all the metadata that is required for an I/O read/write and/or read-ahead request, thereby providing an efficient communication mechanism between various modules for processing the read/write and/or read-ahead operations.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if no caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
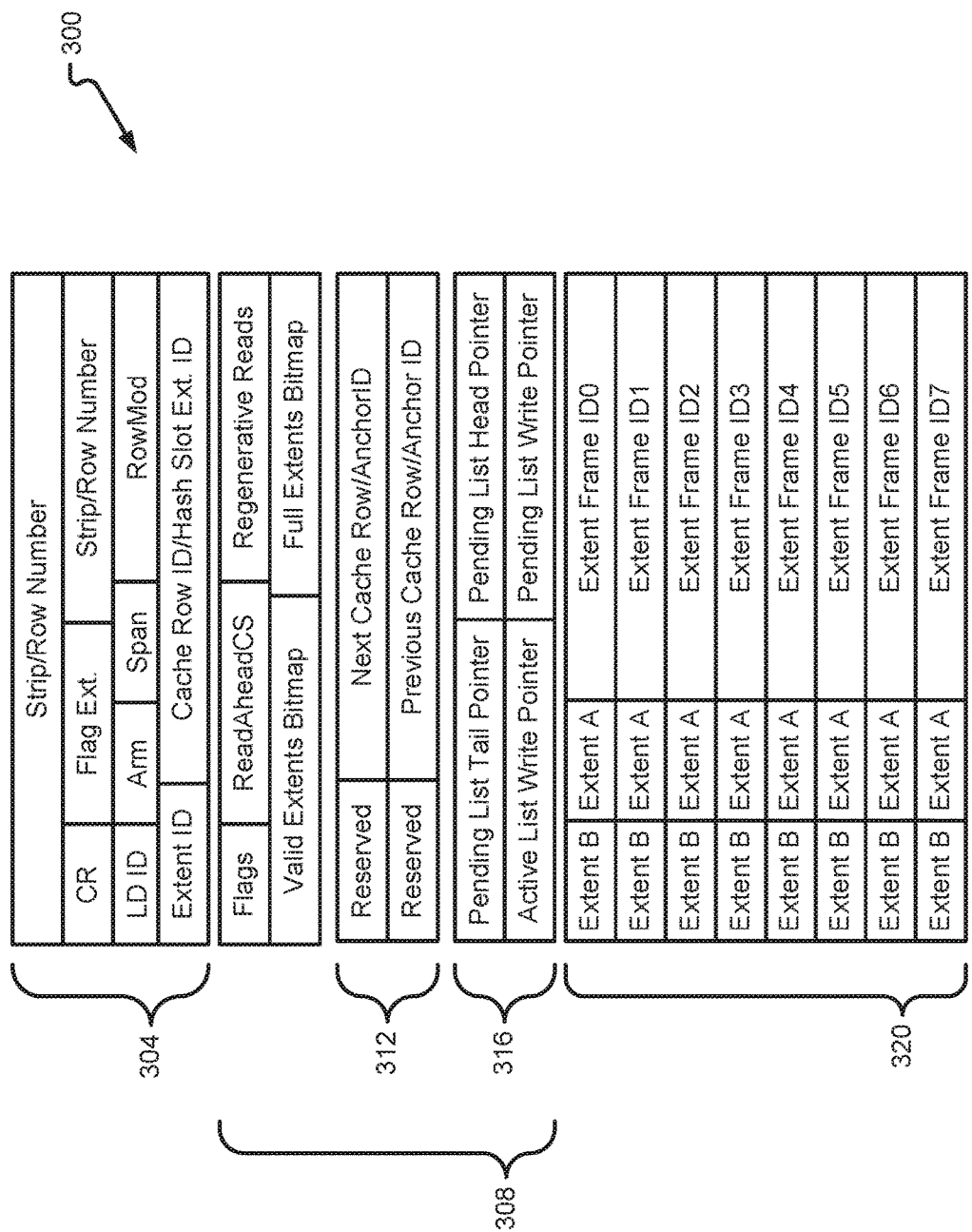
FIG. 3 is a block diagram depicting details of a first data structure used in accordance with at least some embodiments of the present disclosure.

With reference now to FIG. 3, additional details of a first data structure 300 will be described in accordance with at least some embodiments of the present disclosure. The first data structure 300 may be used to store cache segment strip metadata. As a non-limiting example, the first data structure 300 may correspond to part or all of a cache frame anchor 228. Although FIG. 3 shows the data structure 300 as having a particular layout/organizational structure, it should be appreciated that the data structure 300 may be configured in any number of ways without departing from the scope of the present disclosure. The data structure 300 may correspond to a data structure that is created and managed by the cache manager 252 or other components in memory 208.

The data structure 300 is shown to include a hash section 304 as well as a dirty list section 308 that includes first and second sub-sections 312, 316, respectively. The data structure 300 is also shown to include an extents section 320. The various sections of the data structure 300 may be used to store data that enables the controller 208 to utilize variable stripe sizes, thereby taking advantage of different workloads (where different types of commands require different amounts of memory and processing capabilities). In some embodiments, the cache manager 252 shouldn't need to worry about strip sizes, but it would be desirable to enable the cache manager 252 to effectively and efficiently respond to different types read of commands in an appropriate way.

In some embodiments, the hash section 304 includes a number of fields usable in connection with hash searches and other data lookup routines. As a non-limiting example, the hash section 304 may include a strip/stripe number field, a CR field, a flags extension field, a Logical Disk (LD) ID field, an Arm field, a Span field, a RowMod field, an extent ID field, and a cache row ID/hash slot extension ID field.

The strip/stripe number field may store data that identifies the strip/stripe for which the data structure 300 is being used. In some embodiments, the strip/stripe field may uniquely identify a strip or stripe. In some embodiments, the strip/stripe field may identify a memory location (e.g., a starting location) of a strip or stripe of data stored in a storage device 136. For instance, the strip/stripe field may store a number that has been assigned to a particular strip or stripe of data.

The flag extension field may store information describing a memory location of a flag or an identifier of a flag associated with the data structure 300. Various type of flags may be used to identify a type of data stored in connection with the data structure 300 and the flag extension field may be used to identify that type of data.

The LD ID field may contain an identifier or multiple identifiers of logical disks used to store the data. The logical disk may be identified by a memory location or by some alias used in a naming scheme for the logical disks being managed by the controller 108.

The arm field may store a current value of a logArm parameter. The Span field may store a value describing a number of data blocks spanned by a particular set of data. The extent ID field may store information uniquely identifying an extent frame from among other extent frames. The cache row ID/hash slot extension ID field may contain data describing or uniquely identifying a cache row and/or hash slot extension.

The dirty list section 308 is shown to include a flags field, a readaheadCS field, a regenerative reads field, a valid extents bitmap field, and a full extents bitmap field. The dirty list section 308 is also shown to include a first sub-section 312 and a second sub-section 316.

The flags field in the dirty list section 308 may contain an identifier of one or more flags associated with the dirty list identified by the data structure 300. The readaheadCS field may contain an identifier of a cache segment used for a read-ahead operation as will be discussed in further detail herein. The regenerative reads field may contain a count of a number of regenerative reads performed in connection with a dirty list, a specific piece of data, and/or in connection with a read-ahead operation. The valid extents bitmap may contain a link to a bitmap stored in local controller memory or may actually correspond to a bitmap identifying a number and location of valid extents associated with the data structure 300. The full extents bitmap may contain a link to a bitmap stored in local controller memory or may actually correspond to a bitmap identifying a number of full extents associated with the data structure 300. In some embodiments, the valid extents bitmap and full extents bitmap may refer to one or more extent frames within the extents section 320 of the data structure 300.

The first sub-section 312 of the dirty list section 308 may contain information that describes a cache segment in the dirty list LRU or in a read-ahead list. The information contained in this first sub-section 312 may include a number of reserved data fields, a next cache row/anchor identifier field, and a previous cache row/anchor identifier field. The next cache row/anchor identifier field and previous cache row/anchor identifier field may be used to create a linked lists of cache segments. This linked list may be used in connection with performing a read-ahead operation or any other operation performable by the controller 108. In some embodiments, the next cache row/anchor identifier field and previous cache row/anchor identifier field may be used to track a balance of a tree/chain structure. The data structure 300 may organize data based on LBA and based on a tree structure. As buffer segments are needed to accommodate the need for more buffer memory, the data structure 300 may be updated to reflect the addition of buffer segments to the tree/chain. These cache row/anchor identifier fields may store information that links specific cache segment IDs to one another in this tree/chain structure, thereby facilitating the creation of variable stripe sizes. As the names suggest, the next cache row/anchor identifier may contain information that identifies a next cache row or anchor in a chain of cache rows (relative to a currently allocated cache row) whereas the previous cache row/anchor identifier field may contain information that identifies a previous cache row/anchor in a chain of cache row (relative to the currently allocate cache rows). As additional cache rows are added to the tree/chain, the fields may both be updated to continue tracking the progressive building of the cache segment chain.

The second sub-section 316 of the dirty list section 308 may be used to store information related to pending and active list pointers. Specifically, and without limiting embodiments of the present disclosure, the second sub-section 316 may contain an identifier for a pending list tail pointer, a pending list head pointer, an active list write pointer, and a pending list write pointer. These pointers may be used to manage and organize cache segments that are not in the dirty list LRU or in the read-ahead list (as compared to the cache segments identifier in the first sub-section 312 that are in the dirty list LRU or in the read-ahead list).

The extents section 320 is shown to include a plurality of extent frames and corresponding cache segment extents. In some embodiments, the extents may store 2 nibbles of data that describe information contained within the extent section 320. The nibbles in extent section represents the extent number of the extent stored in extent frame. For 1 MB Cache data, there can be max 17 extents (each extent represents 64K data) out of which 1 extent is part of anchor frame and hence extent section represents remaining 16 extents. For example, anchor frame may have extent 5. Extent frame ID0 may have extents 01 and 02. Extent Frame ID1 may have extents 00 and 04. Extent Frame ID2 may have extents 05 and 06. Extent Frame ID3 may have extents 16 and 12 and so on. The extents themselves don't need to be consecutive. By providing the extent frames consecutively in memory (although not a requirement), the extents in the extents section 320 can be scaled to store up to 1 MB of data in total (or more). In some embodiments, each extent can represent up to 64 kB of data. Hence, for a stripe size of 64 kB only one extent that fits in the data structure 300 is needed. For a 1 MB stripe size, sixteen extents would be needed (if each extent represents 64 kB of data), which means that a total of seventeen cache frame anchors would be needed (including the metadata). Although eight extents and extent frames are depicted, it should be appreciated that a greater or lesser number of extents and extent frames can be used without departing from the scope of the present disclosure. By enabling the chaining of multiple extents, variable stripe sizes can be accommodated. In some embodiments, not all extents or extent frames are allocated upon creation of the data structure 300. Instead, extents and extent frames can be allocated on an as-needed basis (e.g., in response to different commands, like a read-ahead command). As can be appreciated, data stored in the data structure 300 may be cleared when the corresponding data is committed to a storage media (e.g., a storage device 136).

Figure 4:
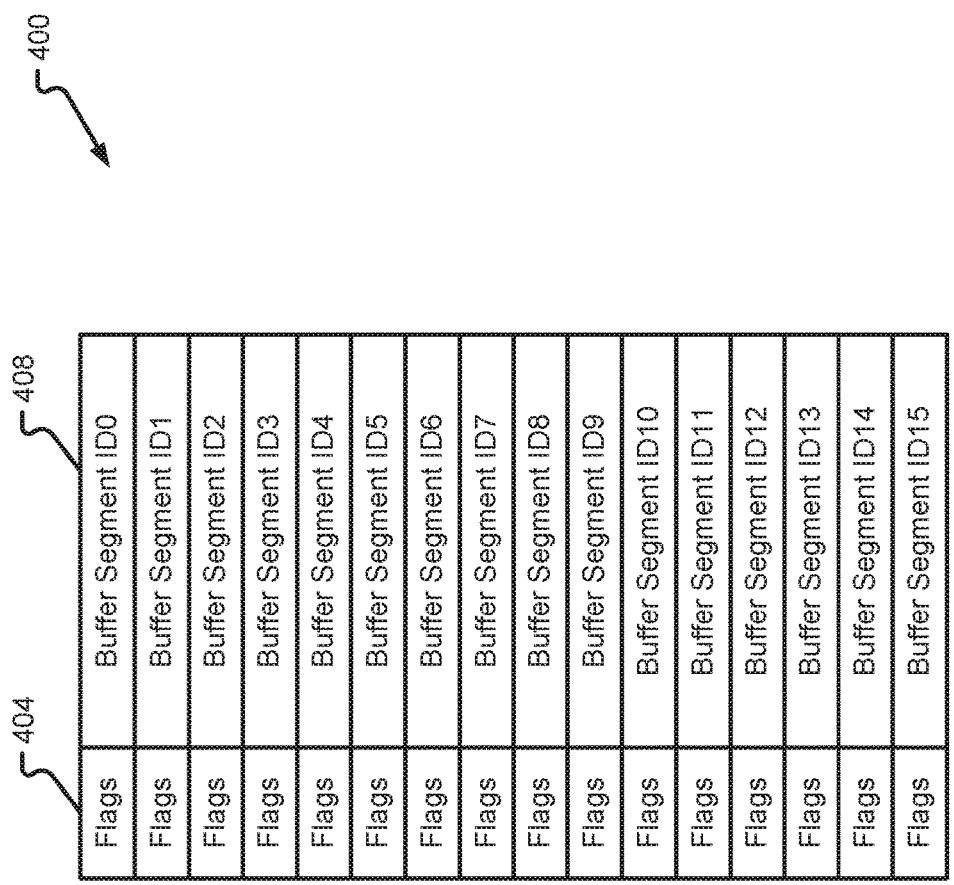
FIG. 4 is a block diagram depicting details of a second data structure used in accordance with at least some embodiments of the present disclosure.

With reference now to FIG. 4, a second data structure 400 will be described in accordance with at least some embodiments of the present disclosure. The second data structure 400 may correspond to a buffer segment section and, more specifically, a cache segment buffer extent section. The second data structure 400 may, therefore, be used in connection with the first data structure 300. Said another way, each data structure 300 may have a corresponding data structure 400 associated therewith to manage the specific buffer extents associated with a cache segment.

The second data structure 400 is shown to include a plurality of buffer segments that include a buffer segment ID field 408 and a flag field 404. The buffer segment ID field 408 may be used to store identification information for buffer segments that have been used in buffer memory 220. A buffer segment section may be configured to store up to twice as much data as the extents section 320. As an example, if the extension section 320 is configured to store up to 32 Bytes of data, then the corresponding buffer segment section may be configured to store up to 64 Bytes of data. The flag field 404 may be configured to store flag information that indicates one or more of: whether a corresponding buffer segment is valid; whether a corresponding buffer segment is dirty; whether a corresponding buffer segment is flushing; whether a corresponding buffer segment has been trimmed; and/or a use count for a corresponding buffer segment.

As can be seen in FIG. 4, a plurality of buffer segment sections (e.g., each row corresponding to a different buffer segment section) are depicted. In some embodiments, each group of buffer segment sections is represented by a corresponding extent. Said another way, an extent can be used to represent a plurality of aligned and contiguous buffer segments. In the depicted embodiment, a first extent is represented by the first plurality of buffer segment sections and a second extent is represented by the second plurality of buffer segment sections. As they come into existence (on an as-needed basis), the extents are grouped two-by-two, sharing one frame. The two nibbles of the extents n1/n0 field in the data structure 300 indicate which two extents share the frame that is referenced by the extent frame ID field. An extent nibble is considered invalid when it is equal to the anchor's identity ID field that is used to indicate the ordinal of the anchor's extent. When a next extent comes into existence, the extent gest stored into the first empty half-frame and if no half-frame is available, then a new frame gets allocated and that frame's ID is stored into the next available extent frame ID location in the data structure 300.

Figure 5:
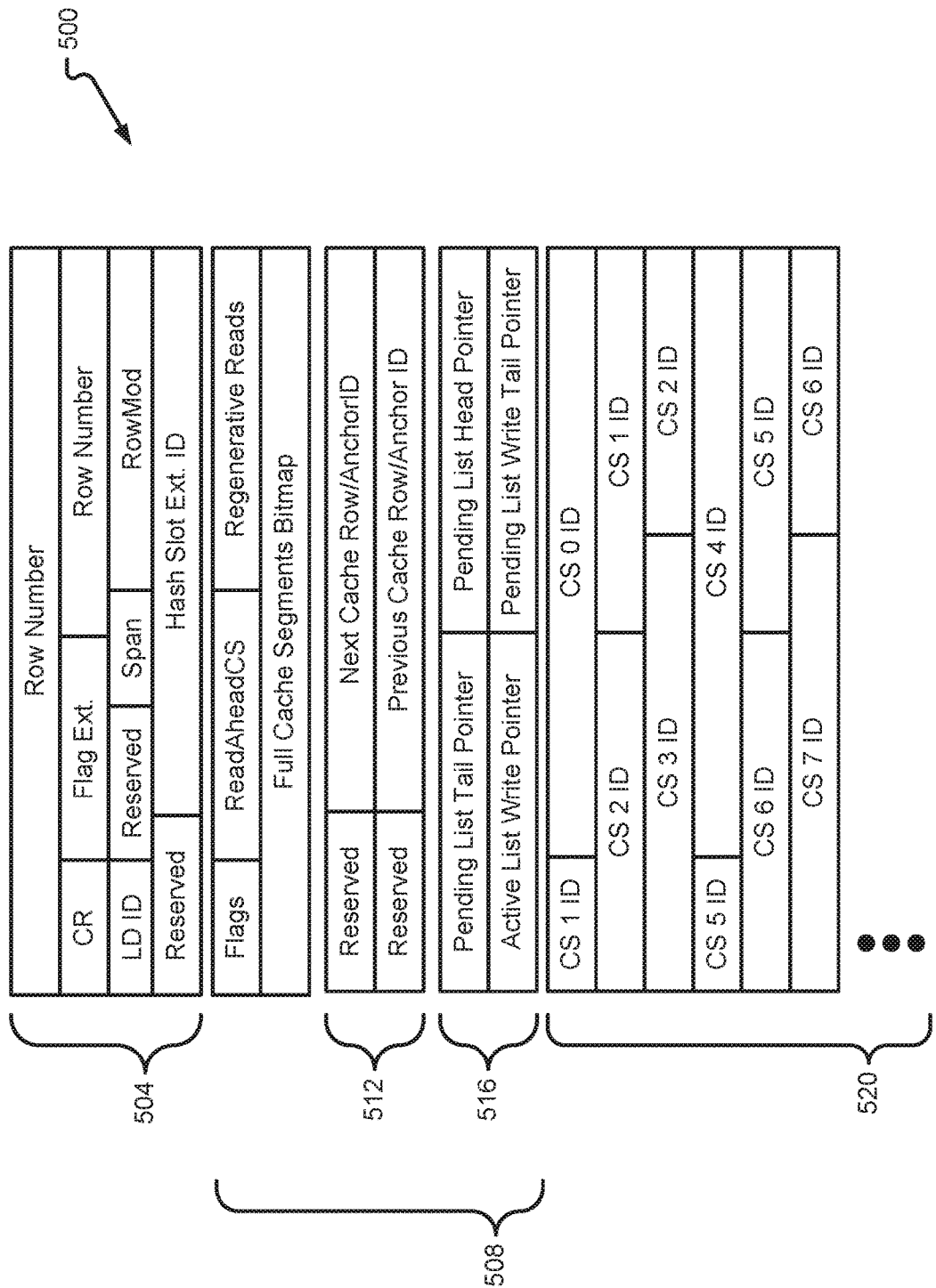
FIG. 5 is a block diagram depicting details of a third data structure used in accordance with at least some embodiments of the present disclosure.

With reference now to FIG. 5, a third data structure 500 will be described in accordance with at least some embodiments of the present disclosure. The third data structure 500 is similar in many respect to the first data structure 300. The third data structure 500, however, may be used to store cache row metadata as opposed to cache segment strip metadata. The third data structure 500 is shown to include a hash section 504 (similar to hash section 304), a dirty list section 508 (similar to dirty list section 308), and a strips section 520. The hash section 504 is shown to include a row number field, a CR field, a flag extension field, an LD ID field, one or more reserved fields, a span field, a RowMod field, and a hash slot extension ID field.

The row number field may be similar to the strip/row number field in the data structure 300 except that there is no strip identifier in the data structure 500. The hash slot extension ID field may be similar to the cache row ID/hash slot extension ID field of the data structure 300 except that there is not identification of a cache row ID in the hash slot extension ID field of data structure 500. Otherwise, many of the features of the hash section 504 are similar to the hash section 304.

The dirty list section 508 is shown to include a flags field, a readaheadCS field, and a regenerative reads count field, similar to the dirty list section 308. The dirty list section 508, however, is shown to include a full cache segments bitmap as compared to a valid extents bitmap and full extents bitmap. The full cache segments bitmap may contain a bitmap for the full cache segments in the strips section 520.

The first sub-section 512 and second sub-section 516 of the dirty list section 508 may be similar or identical to the sub-sections 312, 316 of the dirty list section 308. These sub-sections 512, 516 may be used to create or maintain a tree or linked list of a plurality of data structures 500.

The strips section 520 is shown to include fields for a plurality of cache segment IDs. The cache segment IDs contained in the strips section 520 may contain data or point to data stored for a particular strip or cache segment. Although fields for only eight cache segments (e.g., cache segments 0-7) are depicted, it should be appreciated that the data structure 500 may accommodate a larger number of cache segment fields. For instance, the strips section 520 may include fields for up to 28 cache segment fields without departing from the scope of the present disclosure.

With reference now to FIG. 6, additional details of another data structure 600 will be described in accordance with at least some embodiments of the present disclosure. The data structure 600 may correspond to an LMID used to communicate data between the various managers or modules of the controller 108. In some embodiments, the LMID may correspond to a readahead LMID that is used to facilitate a hardware-based read-ahead process or routine. The data structure 600 is shown to include a function identification field, an operational code field, a host tag or parent LMID field, a message flag field, an MSI index field, a next LMID identification field, a Logical Drive (LD) number field, a VF_ID field, a counter field, an MPI flags field, a Scatter Gather List (SGL) skip count/offset field, a span field, a RowMod field, a strip/row number field, a reserve field, an arm field, an offset in arm field, a second strip/row number field, a number of blocks to read-ahead field, a lead ISGL or RSGL ID field, a control flags field, a data HSGL or RSGL ID field, a primary reference tag field, a primary application tag mask, a primary application tag field, a full hit bitmap field, an extension flags field, an extension ID field, and a buffers descriptor field. Some or all of these fields may be used in connection with performing a read-ahead process, determining where to begin the read-ahead process, determining where to end the read-ahead process, etc. The data structure 600 is specifically useful to enable certain managers (e.g., the cache manager 252 and buffer manager 248) to communicate with one another and coordinate their efforts with respect to performing a read-ahead process.

Figure 7:
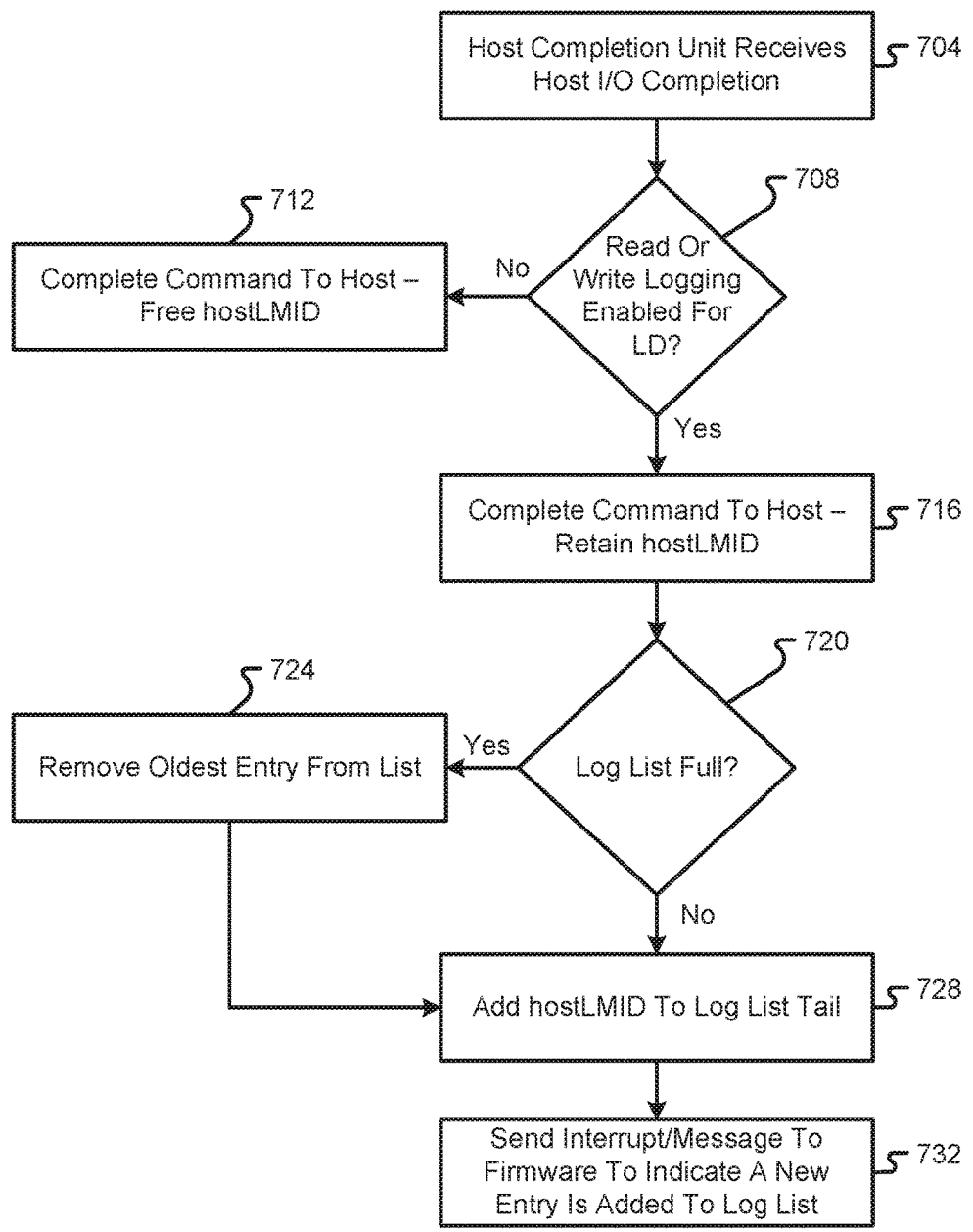
FIG. 7 is a flow diagram depicting a logging method in accordance with embodiments of the present disclosure.

With reference now to FIG. 7, additional details of a logging method will be described in accordance with at least some embodiments of the present disclosure. The logging method depicted in FIG. 7 may correspond to a read-ahead logging method where a firmware configurable parameter is provided to enable/disable logging of host read/write I/Os. Accordingly, the method begins upon the host completion unit/engine 244 receiving an indication that a host I/O completion (step 704). The method continues by determining if read or write logging is enabled for the LD/volume used for the I/O command (step 708). This determination may be made by the completion unit/engine 244 or any other manager in the controller 108. If logging is not enabled for the specified volume, then the I/O completion command is issued by the controller 108 and sent back to the host system 104 (step 712). In some embodiments, the host I/O is completed back to host and the I/O frame (LMID) is freed. It should be noted that this LMID frame can be re-used for another I/O after being freed). The I/O command is completed to the host completion engine 244 which may issue a corresponding message to the host system 104 indicating that the I/O has been completed.

If, however, the logging is enabled for the specified volume, then the I/O is completed to the host system 104, but the hostLMID is not freed up as it was in step 712. Rather, the hostLMID is logged in a register to start a fresh list or is linked to an existing list (step 716). The controller 108 hardware may maintain a loghead and logtail register to store the head and tail of the log list and updates the LMID ID in this register if the head is INVALID. If the register contains a valid LMID ID, then the hardware updates the NextLMID field of the LMID (see data structure 600) in the logtail with a new LMID ID and extends the link by updating the Next LMID field. The controller 108 may further be enabled to clear the log head register whenever the firmware of the controller 108 reads the LMID from that register.

The method will continue with the firmware of the controller 108 analyzing the LMID to determine if the log list is currently full (step 720). If so, the oldest entry will be removed from the log list (step 724) prior to adding the hostLMID to the log list tail (step 728). The hardware of the controller 108 will then send an interrupt/message to the firmware of the controller to indicate a new entry has been added to the log list (step 732).

In some embodiments, the firmware of the controller is able to analyze an LMID and get the next LMID by walking the list using the nextLMID field in each LMID until the nextLMID is NULL. If the nextLMID is NULL, then the firmware reads the loghead register to get the new list head, if any exists. While the firmware is processing a list, if a new LMID is logged by the hardware, then the hardware of the controller will start a new list by populating the LMID in the loghead register which was previously cleared. By enabling the hardware to maintain the loghead and logtail register, the hardware of the controller 108 will allow data to sit in the cache memory 148 until another I/O gets a full hit, thereby enabling an immediate return of the data. log list is readable by firmware. on the other hand, the commands have already been acknowledged to the host.

The hardware of the controller 108 wants to give the firmware a chance to look at LMIDs, but there is a desire to avoid waiting too long if firmware is taking too long. It is desirable to allow the firmware and hardware to share the LMIDs. The logging is not impactful on the execution of I/Os because they still execute at hardware speed, but you allow the firmware to inspect what is happening.

Figure 8:
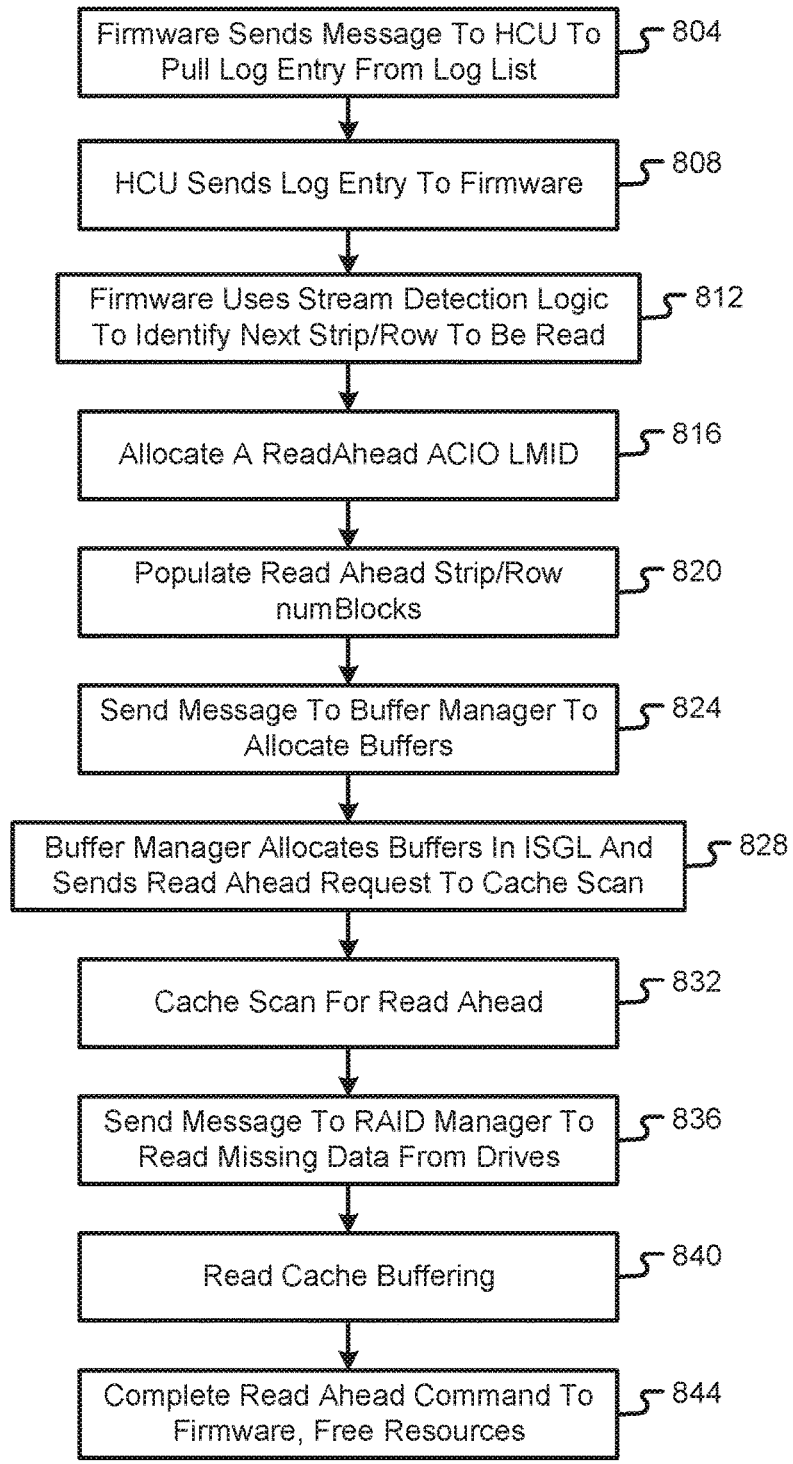
FIG. 8 is a flow diagram depicting a read-ahead method in accordance with embodiments of the present disclosure.

With reference now to FIG. 8, additional details of a read-ahead process will be described in accordance with at least some embodiments of the present disclosure. The method begins with the firmware fetching an entry from the log list. This can be achieved by sending a message to the hardware of the controller 108 to pull the log entry from the log list (step 804). The hardware then responds to the firmware by sending the log entry back to the firmware (step 808). The firmware of the controller 108 then uses stream detection logic or some other method to identify the next strip/row to be read (step 812). The firmware may be enabled to analyze the LMID(s) received from the hardware and determine the sequential stream based on the LBA range and the LD number.

If the firmware of the controller 108 decides to read ahead, then the firmware will allocate a new LMID (step 816) and populate the new LMID with appropriate parameters like opcode, ID number, numblocks, starting arm, etc. to make the LMID into a read-ahead LMID (step 820). The firmware then sends the LMID to the buffer manager 248 as a request for one or more buffers to be allocated (step 824). In response to receiving the LMID, the buffer manager 248 may allocate the appropriate number of buffers. Specifically, the buffer manager 248 may allocate an ISGL and BSIDs as-per the request in the read-ahead LMID (step 828). In some embodiments, the buffer manager 248 may allocate the buffers and populate them with BSIDs in the ISGL. The buffer manager 248 can also leave the first ISGE slot blank for the CSID, which can be later allocated by the cache manager 252. The CSID can be followed by BSIDs in the ISGL. It should be appreciated that read buffers may be allocated from the same pool as write buffers if an appropriate buffer allocation counter is maintained. The read buffer counter can be incremented whenever a read buffer is allocated by the buffer manager 248.

Once buffer allocation is completed, the buffer manager 248 can forward the read-ahead LMID to the cache manager 252, which causes the cache manager 252 to perform a cache scan for the read-ahead process (step 832). In some embodiments, the cache manager 252 may perform a hash search using the strip/row number and the VF_ID number available in the read-ahead LMID. If the hash search results in a hash hit, then the cache manager 252 checks to see if a flush is active on the strip or row. If a flush is not active, then the cache segment is removed from the dirty list if already present in the dirty list. If there is a hash miss, then the cache manager 252 will allocate a new cache segment and add the same to the hash.

If there is a hash hit and a flush is active on the strip or row, then the cache segment is loaded into local memory of the controller 108. The cache manager 252 will check to see if the cache segment is a row and check to see if the full arm bitmap in the data structure 600 is set for any arms and sets a corresponding full hit bitmap in the read-ahead LMID. This is done to avoid reading strips from the storage devices 136 that are already present in the cache memory 148. The cache manager 252 can choose to populate the row/strip CSID in the first ISGE of the ISGL. This can help to avoid repeated hash searching while updating cache segments at the end of a read-ahead process. Alternatively, the hardware of the controller 108 can also perform the hash searches if the CSID is not saved in the ISGL or LMID memory.

The cache segment can then be marked as a read-ahead type of cache segment to avoid being freed even when the read count becomes zero. The flags can be helpful in two ways: (1) it prevents the cache segment from being freed and (2) it prevents the buffers from being freed in the cache segment extents when the read count in the buffer segment flags becomes zero. If all of the requested read-ahead data is available in cache memory 248, then the read-ahead command is completed to firmware. Otherwise, the read-ahead LMID is sent to the raid manager 256 to read the missing data from the device(s) 136 (steps 836, 840). In some embodiments, even if partial data is available in the cache memory 248, it may be more efficient to read all of the data from the devices 136 rather than piecing together data from the devices 136 with data from the cache memory 248. When completed, the command is sent to cache manager 252 so that the buffers in the ISGL are stitched into the cache segment's extents. This stitching operation involves updating the buffer segment ID in the ISGL into the extent section. If there is a valid or dirty buffer already present in the extent section, the buffer segment in the ISGL is freed. After stitching, the command is completed back to firmware (step 844).

Figure 9:
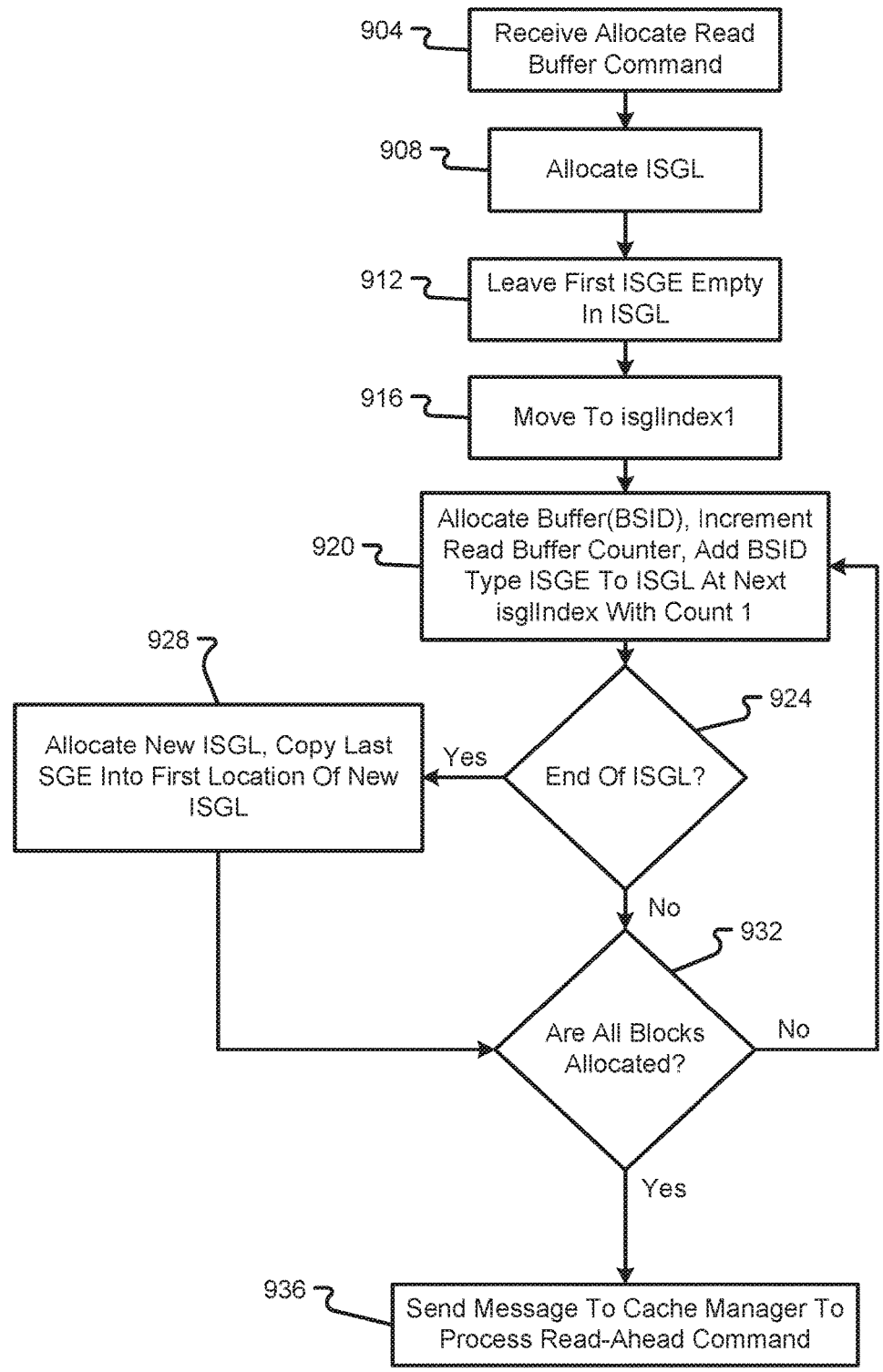
FIG. 9 is a flow diagram depicting a method of allocating read buffers in accordance with embodiments of the present disclosure.

With reference now to FIG. 9, additional details of a method of allocating read buffers will be described in accordance with at least some embodiments of the present disclosure. As discussed above, the buffer allocation method may be performed in connection with executing a read-ahead process. It should be appreciated, however, that the buffer allocation method disclosed herein can be used for allocating buffers for any type of I/O operation (e.g., read, write, read-ahead, etc.). The method begins when the buffer manager 248 receives the allocate buffer(s) command (step 904). This command may be received in the form of an LMID or multiple LMIDs. The buffer manager 248 proceeds by allocating an ISGL (step 908) and leaving the first ISGE in the ISGL empty (step 912). This provides a blank for the CSID, which can be later allocated by the cache manager 252.

The buffer manager 248 continues by moving to an initial or starting ISGL index (e.g., isglIndex1) (step 916). The buffer manager 248 then allocates a buffer (BSID), increments the read buffer counter, adds the BSID type ISGE to the ISGL at the next ISGL index with a count of '1' (step 920). The buffer manager 248 then determines if it has reached the end of the ISGL (step 924). This may be positively answered if there are no additional ISGEs identified in the current ISGL. If the query of step 924 is answered affirmatively, then the buffer manager 248 allocates a new ISGL, and copies the last SGE into the first location of the new ISGL (step 928). Thereafter, or if the query of step 924 is answered negatively, the buffer manager 248 determines if all necessary blocks have been allocated (step 932). If all blocks have not be allocated, then the method returns to step 920. Otherwise, the method proceeds with the buffer manager 248 sending a message to the cache manager 252 to process the read-ahead command (step 936).

Figure 10:
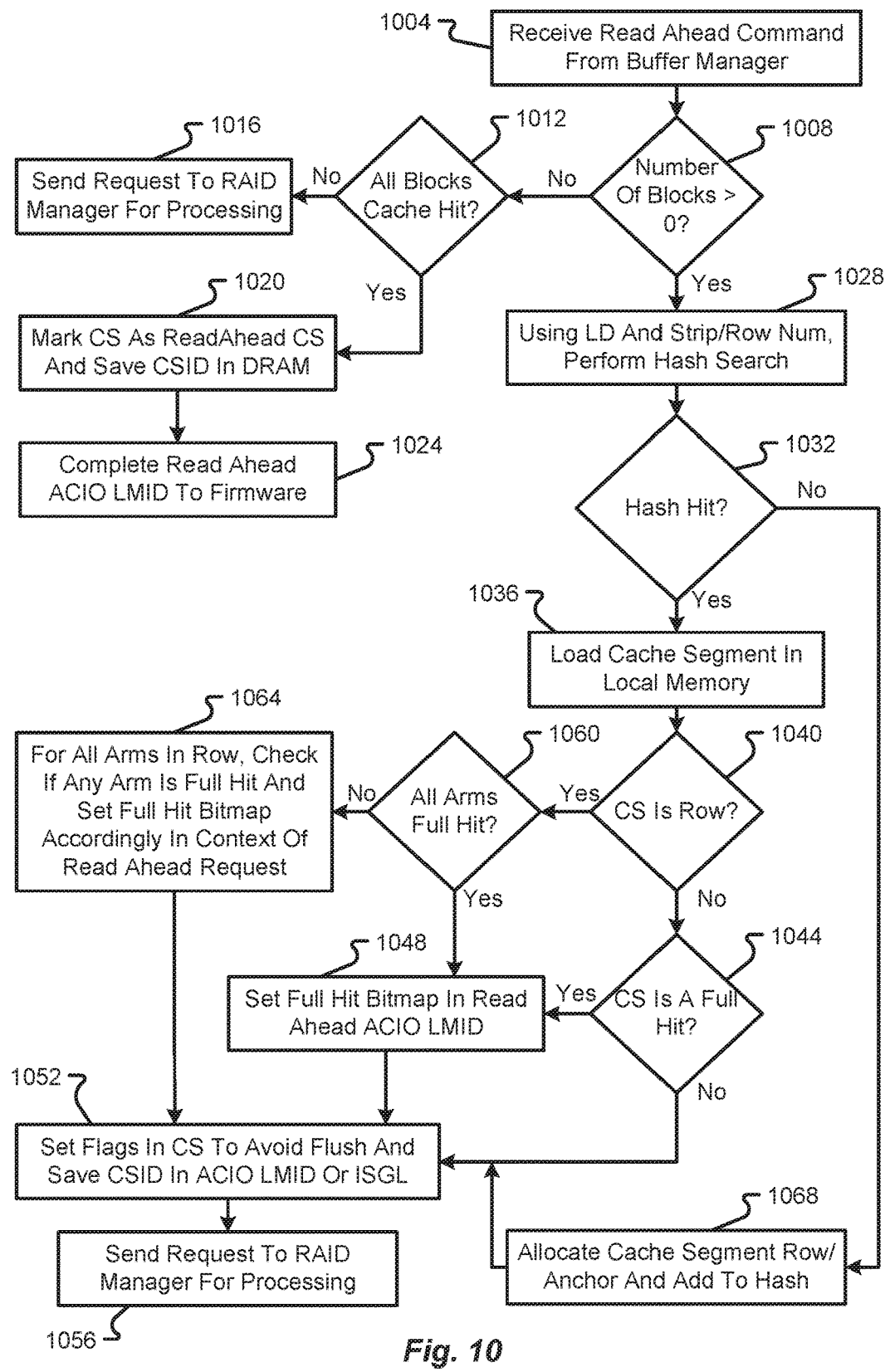
FIG. 10 is a flow diagram depicting a method of performing a cache scan for a read-ahead process in accordance with embodiments of the present disclosure.

With reference now to FIG. 10, additional details of a cache scan method performed in connection with a read-ahead process will be described in accordance with at least some embodiments of the present disclosure. The method begins when a read-ahead command is received at the cache manager 252 from the buffer manager 248 (step 1004). The read-ahead command may be received in the form of a read-ahead LMID.

The cache manager 252 continues by determining if the number of blocks identified in the read-ahead command is greater than zero (step 1008). If not, then the cache manager 252 determines if all blocks result in a hash hit (e.g., there is a full cache hit) (step 1012). If there is not a full cache hit, then the cache manager 252 sends the read-ahead LMID to the RAID manager 256 for processing (step 1016). In some embodiments, this causes the RAID manager 256 to read the requested data completely from the storage device(s) 136. If there is a full cache hit, then the cache manager 252 marks the corresponding cache segment (CS) as a read-ahead CS and saves the corresponding CSID for the CS into its local memory (e.g., in DRAM) (step 1020). Then the cache manager 252 completes the read-ahead LMID and forwards it along to firmware of the controller 108.

Referring back to step 1008, if the number of blocks is greater than zero, then the cache manager 252 performs a hash searching using the LD and strip/row number contained in the read-ahead LMID (step 1028). The cache manager 252 then determines if there is a hash hit during the hash search (step 1032). If so, then the cache manager 252 loads the corresponding cache segment into local memory 148 (step 1036). Thereafter, the cache manager 252 determines if the CS is a row (step 1040). If not, then the cache manager 252 determines if the CS is a full hit by referring to one or more bitmaps in the read-ahead LMID (step 1044). If the CS is not a full hit, then the cache manager 252 will set one or more flags in the CS to avoid a flush process and saves the CSID into the LMID or into an appropriate ISGL (step 1052). Thereafter, the cache manager 252 will send the read-ahead LMID to the RAID manager 256 for further processing (step 1056).

Referring back to step 1044, if the CS is a full hit, then the cache manager 252 will set the full hit bitmap in the read-ahead LMID indicating a full hit (step 1048). The method will then proceed to step 1052.

Referring back to step 1040, if the CS is determined to be a row, then the cache manager 252 will determine if all arms correspond to a full hit (step 1060). If so, then the method proceeds to step 1048. If not, then the cache manager 252 will check if any arm is a full hit and set the full hit bitmap accordingly in the context of the read-ahead request. This will be performed for all arms in the row (step 1064). Thereafter, the method proceeds to step 1052.

Referring back to step 1032, if there is not a full hash hit, then the cache manager 252 will proceed bypass the cache segment search process and allocate a cache segment row/cache segment anchor and add the hash to the newly-allocated cache segment row (step 1068). Thereafter, the cache manager 252 will proceed to step 1052.

Figure 11A:
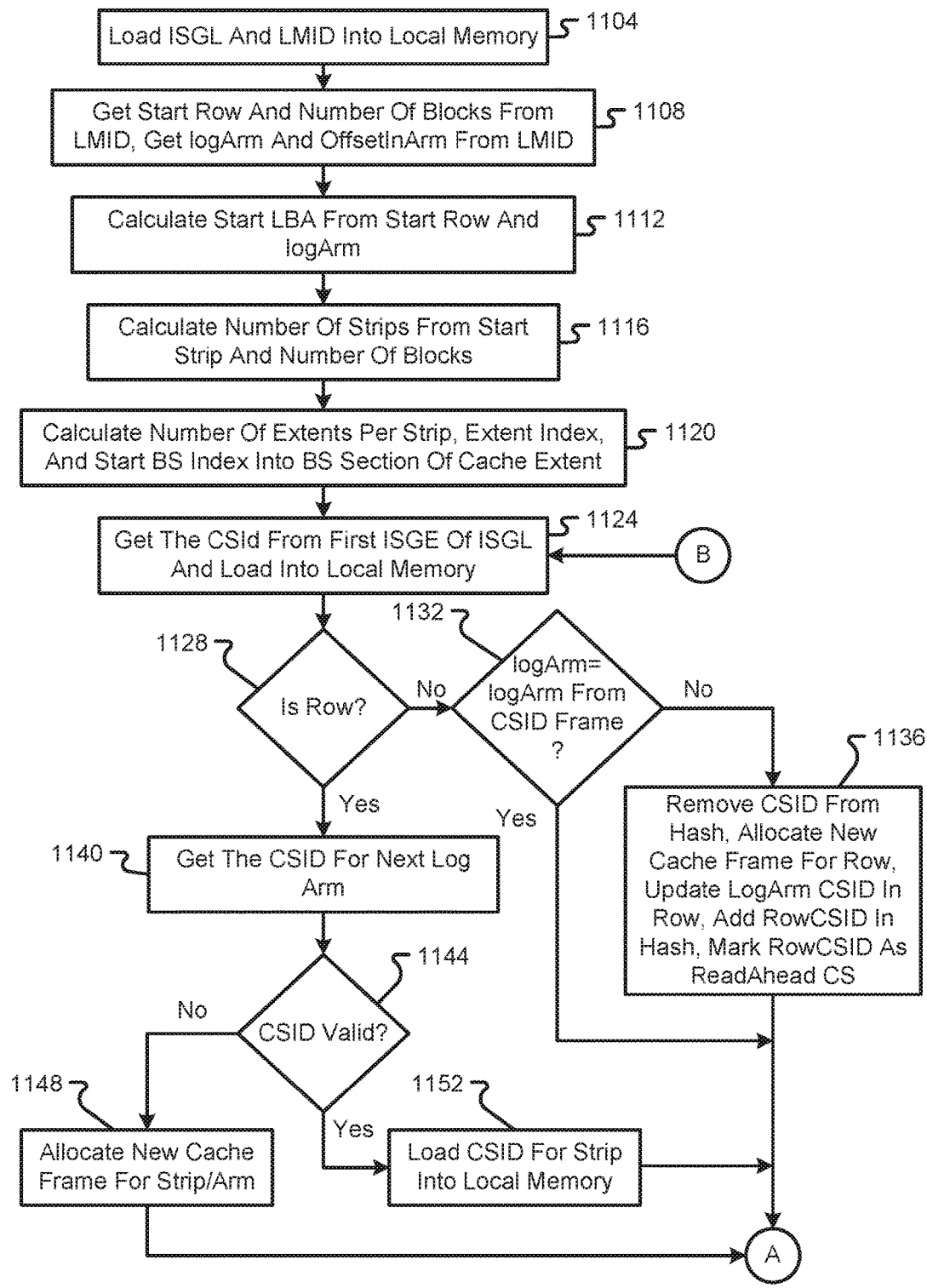
FIG. 11A is a flow diagram depicting a first portion of a read cache buffering process in accordance with embodiments of the present disclosure.
Figure 11B:
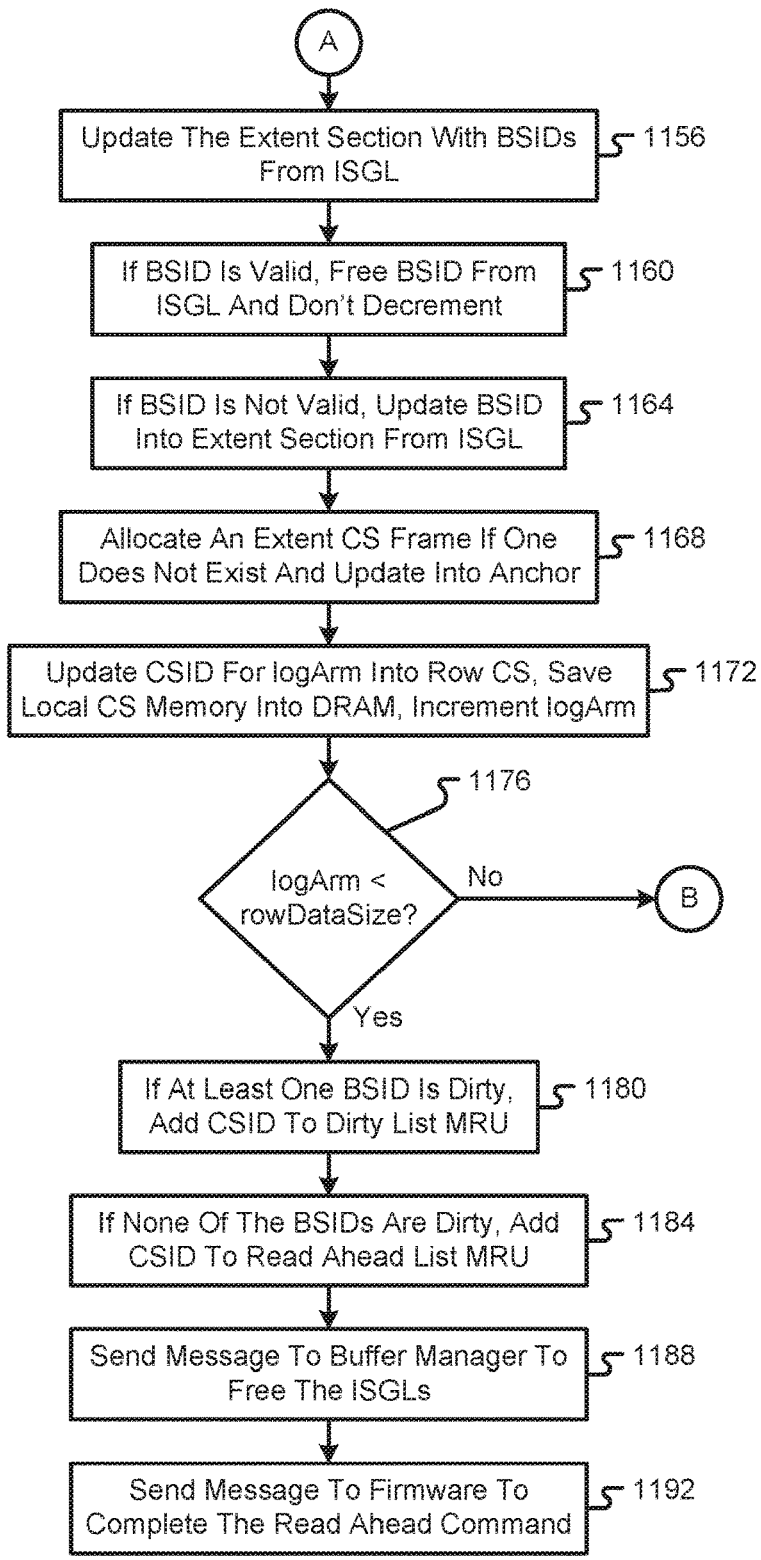
FIG. 11B is a flow diagram depicting a second portion of a read cache buffering process in accordance with embodiments of the present disclosure.

With reference now to FIGS. 11A and 11B, additional details of a read-ahead cache buffering method will be described in accordance with at least some embodiments of the present disclosure. The method begins when a read-ahead LMID is received at the cache manager 252 (step 1104). The LMID may be received from the host I/O manager 232 or the buffer manager 248. This step may also include loading the ISGL that was received along with the LMID. The method continues by obtaining the start row and number of blocks from the LMID, obtaining the logArm, as well as the offset in the arm from the LMID (step 1108). This information is used to calculate the start LBA, the number of rows from the start row that are spanned by the I/O command, the number of extents per strip, an extent index, and the start buffer segment index (step 1112, 1116, 1120). In some embodiments, the start strip and the number of block are obtained directly from the read-ahead LMID. The start LBA is calculated from the start strip. The number of strips needed from the start strip is calculated form the number of blocks needed to accommodate the I/O command. The number of extents per strip is calculated by dividing the strip size by the number of buffer segments in an extent. The extent index is calculated by dividing the offset in the first arm by the number of buffer segments in an extent.

The method then proceeds with the cache manager 252 obtaining the CSID from the first ISGE of the ISGL and loading the CSID into local cache memory 148 (step 1124). The cache manager 252 then determines if the CSID corresponds to a row (step 1128). If so, then the cache manager 252 will obtain the CSID for the next log arm (step 1140) and then determine if the CSID is valid (step 1144). If the CSID is determined to be valid, then the CSID is loaded for the strip into local memory (e.g., cache memory 148) (step 1152). The method then proceeds to step 1156 as will be discussed in further detail herein. If the CSID is determined to be invalid, then the cache manager 252 will allocate a new cache frame for the strip/arm (step 1148). The method then proceeds to step 1156.

Referring back to step 1128, if the CSID is not determined to be a row, then the cache manager 252 checks whether the logarm is equal to the logarm from the CSID frame (step 1132). If so, then the method proceeds to step 1156. If not, then the cache manager 252 will remove the CSID from the hash, allocate a new cache frame for the row, update the log arm CSID in row value for the LMID, add a rowCSID in hash value, and mark the rowCSID in the LMID as corresponding to a read-ahead cache segment (step 1136). Thereafter, the method proceeds to step 1156.

At step 1156, the cache manager 252 will update the extent section with the BSIDs from the ISGL (step 1156). Thereafter, if the BSID is valid, then the cache manager 252 will free the BSID from the ISGL and will not decrement its counter (step 1160). If the BSID is not valid, however, then the BSID will be updated into the extent section from the ISGL (step 1164). Then the cache manager 252 will allocate an extent CS frame if one does not exist and update that cache frame anchor accordingly (step 1168). Then the cache manager 252 will update the CSID for the logarm into the row CS, save the local CS memory into DRAM, and increment the logarm value (step 1172). The cache manager 252 then determines if the logarm value is less than the number of data arms in the RAID array (step 1176). This step helps convey whether or not all of the data arms have been processed. If not, then the method returns to step 1124. If so, then at least one BSID is determined to be dirty and the corresponding CSID is added to the dirty list of one or more data structures 300, 500 (step 1180). If none of the BSIDs are dirty, then the CSID is added to the read-ahead list (step 1184). The read-ahead LMID is then sent to the buffer manager 248 to free the appropriate ISGLs (step 1188). Thereafter, the read-ahead LMID is sent to firmware of the controller to complete the read-ahead command (step 1192).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for read-ahead caching, the method comprising:
   determining that a read-ahead operation is to be performed in response to receiving a host Input/Output (I/O) command;
   in response to determining that the read-ahead operation is to be performed, allocating a new Local Message Identifier (LMID) for the read-ahead operation;
   sending a buffer allocation request to a buffer manager module, the buffer allocation request containing parameters associated with the read-ahead operation;
   causing the buffer manager module to allocate at least one Internal Scatter Gather List (ISGL) and Buffer Section Identifier (BSID) in accordance with the parameters contained in the buffer allocation request;
   enabling the allocated ISGL and BSID to be used in connection with the read-ahead operation;
   transferring information describing the new LMID to a cache manager module; and
   enabling the cache manager module to perform a hash search using a row or strip number and identification information available in the new LMID.

2. The method of claim 1, further comprising:
   performing, by the cache manager module, a hash search using the row or strip number and identification information available in the new LMID;
   determining, during the hash search, that a hash hit has occurred for an identified row or strip;
   in response to determining that the hash hit has occurred, enabling the cache manager module to check if a flush is active on the identified row or strip; and
   in response to determining that the flush is not active, removing a corresponding cache segment from a dirty list.

3. The method of claim 1, further comprising:
   performing, by the cache manager module, a hash search using the row or strip number and identification information available in the new LMID;
   determining, during the hash search, that a hash miss has occurred;
   in response to determining that a hash miss has occurred, enabling the cache manager module to allocate a new cache segment and add the cache segment to a hash.

4. The method of claim 3, further comprising:
   sending the new LMID to a RAID manager module; and
   enabling the RAID manager module to execute the host I/O command by performing the read-ahead operation in which the RAID manager module performs a Direct Memory Access on data and provides the data to one or more buffers associated with the allocated ISGL and BSID.

5. The method of claim 4, further comprising:
   obtaining the data from the RAID manager module, wherein the buffer manager updates the new cache segment with the data obtained from the RAID manager module.

6. The method of claim 1, further comprising:
   determining whether a Cache Segment Identifier (CSID) corresponding to a row or strip is already stored in the new LMID or the ISGL; and
   in the event that the CSID corresponding to the row or strip is already stored in the new LMID or the ISGL, enabling the cache manager module to skip a hash search process.

7. The method of claim 1, wherein the parameters contained in the buffer allocation request comprise one or more of an operation code, an ID number, a number of blocks required for the new LMID, and a starting arm.

8. The method of claim 7, wherein the new LMID represents all information received from the host I/O command, but in a different format that is understandable by the buffer manager module and the cache manager module.

9. The method of claim 1, further comprising:
   maintaining an LMID log that includes an LMID log head register and an LMID log tail register; and
   clearing the LMID log head register when the next LMID is read from the LMID log.

10. A memory control system, comprising:
    a host interface that receives one or more host Input/Output (I/O) commands;
    a storage interface that enables communication with a plurality of storage devices configured in a storage array;
    a microprocessor; and
    memory that includes computer-readable instructions that are executable by the microprocessor, the instructions including:
    instructions that determine that a read-ahead operation is to be performed in response to receiving a host Input/Output (I/O) command;
    instructions that, in response to determining that the read-ahead operation is to be performed, allocate a new Local Message Identifier (LMID) for the read-ahead operation;
    instructions that send a buffer allocation request to a buffer manager module, the buffer allocation request containing parameters associated with the read-ahead operation;
    instructions that cause the buffer manager module to allocate at least one Internal Scatter Gather List (ISGL) and Buffer Section Identifier (BSID) in accordance with the parameters contained in the buffer allocation request;
    instructions that enable the allocated ISGL and BSID to be used in connection with the read-ahead operation;
    instructions that transfer information describing the new LMID to a cache manager module; and
    instructions that enable the cache manager module to perform a hash search using a row or strip number and identification information available in the new LMID.

11. The memory control system of claim 10, wherein the instructions further include:
    instructions that perform, with the cache manager module, a hash search using the row or strip number and identification information available in the new LMID;
    instructions that determine, during the hash search, that a hash hit has occurred for an identified row or strip;
    instructions that, in response to determining that the hash hit has occurred, enable the cache manager module to check if a flush is active on the identified row or strip; and instructions that, in response to determining that the flush is not active, remove a corresponding cache segment from a dirty list.

12. The memory control system of claim 10, wherein the instructions further include:
    instructions that perform, with the cache manager module, a hash search using the row or strip number and identification information available in the new LMID;
    instructions that determine, during the hash search, that a hash miss has occurred;
    instructions that, in response to determining that a hash miss has occurred, enable the cache manager module to allocate a new cache segment and add the cache segment to a hash.

13. The memory control system of claim 12, wherein the instructions further include:
    instructions that send the new LMID to a RAID manager module; and
    instructions that enable the RAID manager module to execute the host I/O command by performing the read-ahead operation in which the RAID manager module performs a Direct Memory Access on data and provides the data to one or more buffers associated with the allocated ISGL and BSID.

14. The memory control system of claim 13, wherein the instructions further include:
    instructions that obtain the data from the RAID manager module, wherein the buffer manager updates the new cache segment with the data obtained from the RAID manager module.

15. The memory control system of claim 10, wherein the instructions further include:
    instructions that determine whether a Cache Segment Identifier (CSID) corresponding to a row or strip is already stored in the new LMID or the ISGL; and
    instructions that, in the event that the CSID corresponding to the row or strip is already stored in the new LMID or the ISGL, enable the cache manager module to skip a hash search process.

16. The memory control system of claim 10, wherein the parameters contained in the buffer allocation request comprise one or more of an operation code, an ID number, a number of blocks required for the new LMID, and a starting arm.

17. The memory control system of claim 16, wherein the new LMID represents all information received from the host I/O command, but in a different format that is understandable by the buffer manager module and the cache manager module.

18. The memory control system of claim 10, wherein the instructions further include:
    instructions that maintain an LMID log that includes an LMID log head register and an LMID log tail register; and
    instructions that clear the LMID log head register when the next LMID is read from the LMID log.

19. A buffer system, comprising:
    buffer memory; and
    instructions that enable management of the buffer memory to facilitate a read-ahead operation to be performed in response to receiving a host Input/Output (I/O) command, the instructions including:
        instructions that receive a buffer allocation request containing parameters associated with the read-ahead operation;
        instructions that allocate at least one Internal Scatter Gather List (ISGL) and Buffer Section Identifier (BSID) in accordance with parameters contained in the buffer allocation request;
        instructions that enable the allocated ISGL and BSID to be used in connection with the read-ahead operation; and
        instructions that transfer a new Local Message Identifier (LMID) used for the read ahead command to a cache manager thereby enabling the cache manager to perform a hash search using a row or strip number and identification information available in the new LMID.

20. The buffer system of claim 19, wherein the new LMID is transferrable between hardware and firmware of a storage controller.

* * * * *